No. 731,681. Patented June 23, 1903.

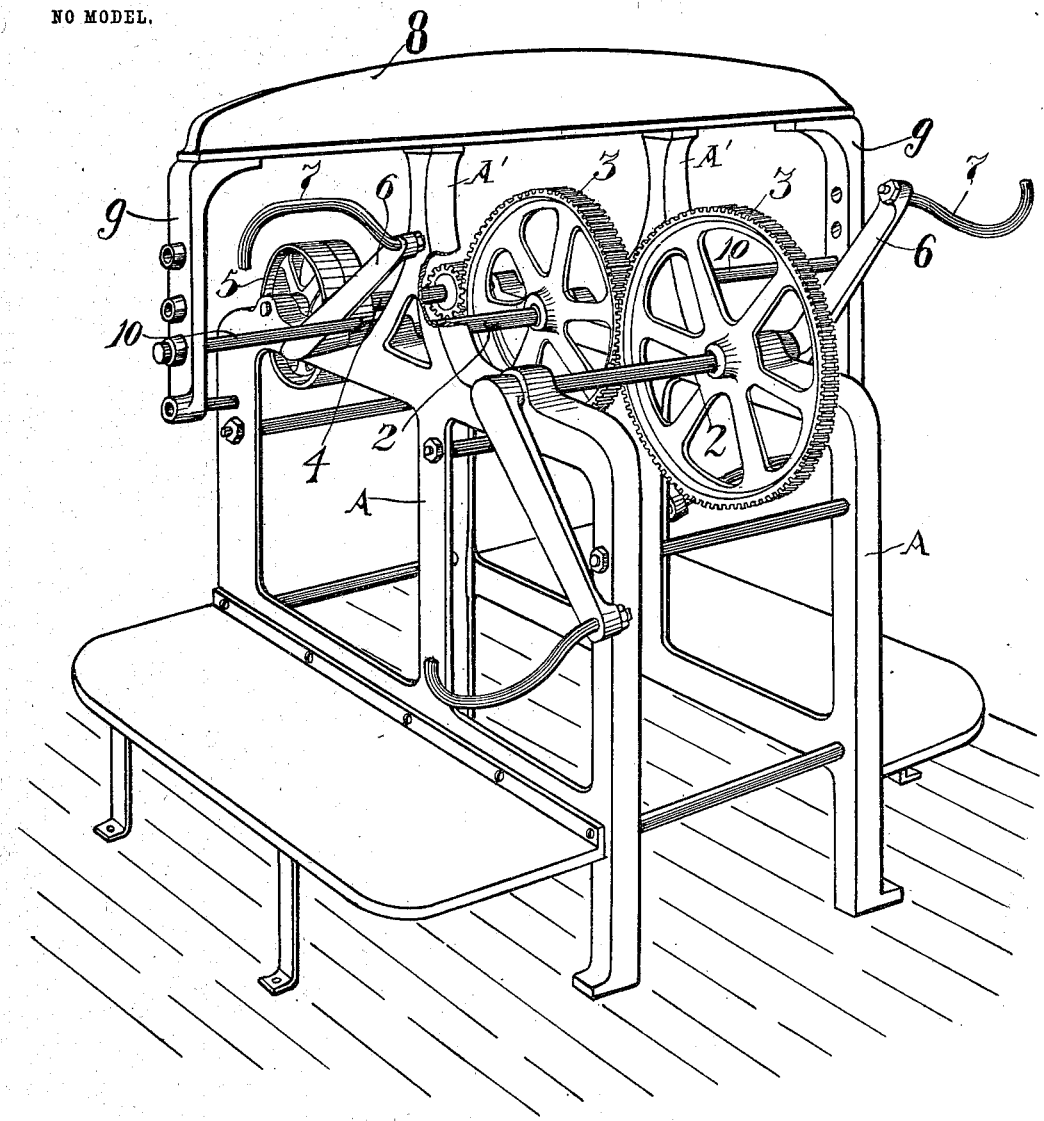

UNITED STATES PATENT OFFICE.

WILLIAM EMIL HENRY, OF SAN FRANCISCO, CALIFORNIA.

CANDY-PULLING MACHINE.

SPECIFICATION forming part of Letters Patent No. 731,681, dated June 23, 1903.

Application filed November 24, 1902. Serial No. 132,640. (No model.)

*To all whom it may concern:*

Be it known that I, WILLIAM EMIL HENRY, a citizen of the United States, residing in the city and county of San Francisco, State of California, have invented an Improvement in Candy-Pulling Machines; and I hereby declare the following to be a full, clear, and exact description of the same.

My invention relates to a machine which is adapted for the pulling of candy, so as to work it into the proper condition during the manufacture.

My invention comprises details of construction which will be more fully explained by reference to the accompanying drawing, in which the figure is a perspective view of a candy-pulling machine embodying my invention.

For the purpose of preparing candy, after the syrup has been boiled to the proper consistency it is allowed to cool, so as to form a waxy and plastic mass of any desired size or weight. This mass, which is at first of a dark color, must be pulled continuously, so as to allow air to be mixed with it, and this gradually bleaches it and lightens it up and makes it fit for the class of candy which is to be made from the batch.

It is the object of my invention to provide a machine for rapidly and economically carrying out this pulling process.

As shown in the drawing, a frame A, of any suitable construction, has shafts 2 journaled transversely across it. Upon these shafts are fixed the intermeshing gear-wheels 3, so that both shafts turn in unison. Power is applied to drive these shafts in any suitable or desired manner. In the present case I have shown a shaft 4 parallel with the shafts 3 and having pulleys 5, through which power may be communicated to rotate the shaft by a belt, and upon this pulley-shaft is a pinion which engages the teeth of one of the gears 3, thus rotating it and its companion in unison.

Upon the outer ends of the shafts 2 are fixed cranks 6, and these cranks have hooks 7 projecting from them, as shown. The frame A is extended up in the center, as shown at A', and across the top I have shown a transverse beam 8, from the outer ends of which depend the arms 9. From these arms bars 10 project inwardly at such points that the hooks 7 as they revolve just pass the bars 10 upon opposite sides and in such relation to each other that when the mass of candy is attached to the hooks it is thrown over the bar 10 as the hook approaches it from one side and is pulled outwardly by the hook as it recedes from this bar. Each hook thus engages the mass of candy and pulls it outward as it recedes from the bar 10, and the operation is thus continued until the mass has been sufficiently mixed with air and bleached to the desired degree. In order to regulate the amount of air which is mixed with the mass, the stationary arms 10 are movable up or down in the hangers 9, so as to stand nearer to the hooks 7 as they approach from above, as they are designed to travel, or farther away from them in this portion of the movement. By this construction I may use either one or two sets of pins and hooks. By having cranks and hooks fixed upon each end of the shafts 2 two batches of candy may be worked at the same time—one hard and the other soft or of varying degrees of consistency—without either in any way interfering with the operation of the other. By fixing the hooks upon the outer ends of the shafts I am enabled to attach or remove the batch of candy at any time without stopping the machine, and there is no danger of the operator becoming entangled with the machinery, because the hooks are entirely outside of the machinery, and the framework and the driving-gears being located within the frame the power is evenly distributed to both ends of the shafts.

Having thus described my invention, what I claim, and desire to secure by Letters Patent, is—

In a candy-pulling machine parallel shafts with intermeshing gears, cranks upon the outer ends of the shafts, and outwardly-extending hooks or arms thereon, fixed supports or hangers exterior to said hooks with pins projecting into the space between the pair of revolving cranks, and means by which said intermediate pins may be adjusted up or down.

In witness whereof I have hereunto set my hand.

WILLIAM EMIL HENRY.

Witnesses:
ROBT. R. PRAY,
E. J. CAMPODONICO.